United States Patent
Yokoyama et al.

(10) Patent No.: US 9,196,221 B2
(45) Date of Patent: Nov. 24, 2015

(54) DISPLAY DEVICE, AND DRIVING CIRCUIT AND METHOD THEREOF

(71) Applicant: Futaba Corporation, Mobara-shi, Chiba-ken (JP)

(72) Inventors: Masaru Yokoyama, Mobara (JP); Takahisa Uehira, Mobara (JP); Terukazu Sugimoto, Mobara (JP)

(73) Assignee: FUTABA CORPORATION, Mobara-Shi (JP)

( * ) Notice: Subject to any disclaimer, the term of this patent is extended or adjusted under 35 U.S.C. 154(b) by 161 days.

(21) Appl. No.: 13/777,002

(22) Filed: Feb. 26, 2013

(65) Prior Publication Data

US 2013/0222441 A1 Aug. 29, 2013

(30) Foreign Application Priority Data

Feb. 27, 2012 (JP) .................................. 2012-040494

(51) Int. Cl.
*G06F 3/038* (2013.01)
*G09G 5/00* (2006.01)
(Continued)

(52) U.S. Cl.
CPC ................ *G09G 5/10* (2013.01); *G06F 3/1438* (2013.01); *G06F 3/1446* (2013.01); *G09G 3/3208* (2013.01); *G09G 5/18* (2013.01); *G09G 2370/08* (2013.01)

(58) Field of Classification Search
CPC ......... G09G 3/3208; G09G 5/10; G09G 5/18; G09G 2310/0205; G09G 2310/021; G09G 2310/0221; G09G 2310/0278; G09G 2310/0283; G09G 2310/08; G09G 2320/0233; G09G 2320/043; G09G 3/3216; G09G 3/3225; G09G 3/3644; G09G 3/3666; G09G 2310/0286; G09G 2320/0252; G09G 2300/026; G06F 3/1438; G06F 3/1446

USPC ......... 345/76–83, 204–215, 690, 1.1–1.3, 84, 345/100, 99
See application file for complete search history.

(56) References Cited

U.S. PATENT DOCUMENTS 7,773,053 B2 * 8/2010 Takayanagi et al. ............ 345/76
2002/0149550 A1 * 10/2002 Ito et al. ........................ 345/87
(Continued)

FOREIGN PATENT DOCUMENTS

CN 1728204 A 2/2006
JP 2000-306532 11/2000
(Continued)

OTHER PUBLICATIONS

Korean Office Action dated Oct. 20, 2014 issued in corresponding Korean application No. 10-2013-0021143 and English translation thereof.
(Continued)

*Primary Examiner* — Liliana Cerullo
*Assistant Examiner* — Roberto Flores
(74) *Attorney, Agent, or Firm* — Bacon & Thomas, PLLC

(57) ABSTRACT

A display device includes L number of display panels where L is a positive integer greater than 1; a driving circuit having L number of controllers for driving the respective display panels; and a central control unit configured to control the driving circuit. The controllers are configured to be synchronized with one another based on a clock signal from the central control unit, and each of the controllers is configured to sequentially and continuously select each one of K number of lines (where K is a positive integer greater than 1) arranged in a row in the corresponding display panel, and allow the selected line to emit light. Further, a direction for sequentially and continuously selecting each one of the lines is set to be the same in all the display panels.

13 Claims, 10 Drawing Sheets

(51) Int. Cl.
  *G09G 3/30* (2006.01)
  *G09G 5/10* (2006.01)
  *G06F 3/14* (2006.01)
  *G09G 3/32* (2006.01)
  *G09G 5/18* (2006.01)

(56) References Cited

U.S. PATENT DOCUMENTS

| | | | |
|---|---|---|---|
| 2003/0043097 A1* | 3/2003 | Shingai et al. | 345/87 |
| 2003/0193455 A1 | 10/2003 | Mizohata et al. | |
| 2004/0169631 A1* | 9/2004 | Tanaka et al. | 345/96 |
| 2005/0248556 A1* | 11/2005 | Yoshinaga et al. | 345/204 |
| 2005/0275644 A1* | 12/2005 | Shen et al. | 345/204 |
| 2005/0275645 A1* | 12/2005 | Shen et al. | 345/204 |
| 2006/0007075 A1* | 1/2006 | Adachi et al. | 345/76 |
| 2006/0022913 A1 | 2/2006 | Takayanagi et al. | |
| 2006/0145964 A1* | 7/2006 | Park et al. | 345/76 |
| 2006/0202936 A1* | 9/2006 | Chen et al. | 345/100 |
| 2006/0221015 A1* | 10/2006 | Shirasaki et al. | 345/77 |
| 2006/0244740 A1* | 11/2006 | Wang | 345/204 |
| 2007/0075937 A1* | 4/2007 | Kim | 345/76 |
| 2007/0109254 A1* | 5/2007 | Kang | 345/103 |
| 2007/0296650 A1* | 12/2007 | Chang | 345/76 |
| 2009/0021519 A1* | 1/2009 | Yusa | 345/536 |
| 2010/0164931 A1* | 7/2010 | Lin et al. | 345/211 |
| 2010/0171688 A1* | 7/2010 | Wang | 345/99 |
| 2010/0188375 A1* | 7/2010 | Lee et al. | 345/204 |
| 2010/0231810 A1* | 9/2010 | Itoh | 348/731 |
| 2012/0212517 A1* | 8/2012 | Ahn | 345/690 |
| 2013/0036335 A1* | 2/2013 | Kim et al. | 714/704 |
| 2013/0076703 A1* | 3/2013 | Baek et al. | 345/204 |

FOREIGN PATENT DOCUMENTS

| | | |
|---|---|---|
| JP | 2006-39457 A | 2/2006 |
| JP | 2006-317535 | 11/2006 |

OTHER PUBLICATIONS

Chinese Office Action dated Feb. 28, 2015 issued in corresponding Chinese application No. 201310061118.0 and English translation thereof.

* cited by examiner

DISPLAY DEVICE, AND DRIVING CIRCUIT AND METHOD THEREOF

FIELD OF THE INVENTION

The present invention relates to a display device, and a driving circuit and driving method thereof.

BACKGROUND OF THE INVENTION

Until now, display devices using an organic light emitting diode (OLED), a liquid crystal display (LCD), a vacuum fluorescent display, and a field emission display (FED) have been proposed as display panels for displaying images. Dots which are minimum light emitting units are two-dimensionally arranged in the flat display panels described above.

The luminance of each dot is controlled in the following manner so that the dots simultaneously emit light. As an example, the dots are controlled in sequential time series (dot drive) to display an image on the display panel. Further, as another example, dots belonging to a line obtained by arranging the dots on a straight line are controlled in time series for each line to simultaneously emit light (line drive), thereby displaying an image on the display panel. As still another example, all dots belonging to a frame constituting one screen are controlled for each frame to simultaneously emit light (frame drive), thereby displaying an image on the display panel.

In a case where light of one color is emitted, a black-and-white image is provided. In a case where three dots respectively corresponding to three primary colors of red (R), green (G) and blue (B) are defined as one group to emit light, a color image is provided. Various techniques for controlling the dots have been proposed. For example, in a display device using a VFD, there has been proposed a driving technique in which respective dots corresponding to divided grid series are scanned in the right or left direction during the same period, and a duty cycle thereof is increased multiple times (see Paragraphs [0033] to [0035] and FIG. 4 of Japanese Patent Application Publication No. 2000-306532).

Recently, as technologies for display devices are developed every year and images of higher precision and large screen are required, the number of dots has been rapidly increased. In connection therewith, there are unsolved problems in that driving circuits also needs to be developed every year to drive a larger number of dots.

As a result of an increase in the number of dots, in the conventional case, the time required to drive one dot is shortened, and the luminance of each dot (dot luminance) should be set high to obtain an image with high luminance. However, in a case where the dot luminance is set high, the lifespan of the various types of display panels described above is shortened. In a case where the line drive is employed, there is an additional problem in that the quality of images displayed is degraded due to interference between lines.

A display device using an OLED has recently come into the spotlight in terms of thin and light display devices. In a case where the luminance of dots in the OLED is increased, particularly as compared with other display panels, the lifespan of the display panel is shortened, and the interference between lines is increased.

SUMMARY OF THE INVENTION

In view of the above, the present invention provides a display device and a driving technique thereof to display an image without interference between lines while extending the lifespan of the display panel, so that the development of a new driving circuit such as a significant change in the configuration of hardware is not required even when the number of dots in a display panel increases/decreases.

In accordance with an aspect of the present invention, there is provided a display device, including: L number of display panels where L is a positive integer greater than 1; a driving circuit having L number of controllers for driving the respective display panels; and a central control unit configured to control the driving circuit. The controllers are configured to be synchronized with one another based on a clock signal from the central control unit, and each of the controllers is configured to sequentially and continuously select each one of K number of lines (where K is a positive integer greater than 1) arranged in a row in the corresponding display panel, and allow the selected line to emit light. Further, a direction for sequentially and continuously selecting each one of the lines is set to be the same in all the display panels.

In accordance with another aspect of the present invention, there is provided a driving circuit of a display device for driving L number of display panels (where L is a positive integer greater than 1) under the control of a central control unit, the driving circuit including: L number of controllers for driving the respective display panels. The controllers are configured to be synchronized with one another based on a clock signal from the central control unit, and each of the controllers is configured to sequentially and continuously select each one of K number of lines (where K is a positive integer greater than 1) arranged in a row in the corresponding display panel, and allow the selected line to emit light. Further, a direction for sequentially and continuously selecting each one of the lines is set to be the same in all the display panels.

In accordance with still another aspect of the present invention, there is provided a driving method of a display device including L number of display panels (where L is a positive integer greater than 1), a driving circuit having L number of controllers for driving the respective display panels, and a central control unit for controlling the driving circuit. The central control unit controls the controllers to be synchronized with one another based on a clock signal; controls each of the controllers to sequentially and continuously select each one of K number of lines (where K is a positive integer greater than 1) arranged in a row in the corresponding display panel connected thereto, and to allow the selected line to emit light; and sets a direction for sequentially and continuously selecting each one of the lines to be the same in all the L display panels.

In accordance with the present invention, as the number of dots in a display panel increases or decreases, the number of controllers having the same configuration is increased or decreased, and the controllers are synchronously operated, so that it is possible to drive a wide range of display panels with various numbers of dots. Further, the dot luminance is controlled to be low while increasing the luminance of a displayed image, so that it is possible to extend the lifespan of the display panels. Further, the interference between the lines is prevented, thereby improving the quality of an image.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Figure 1:
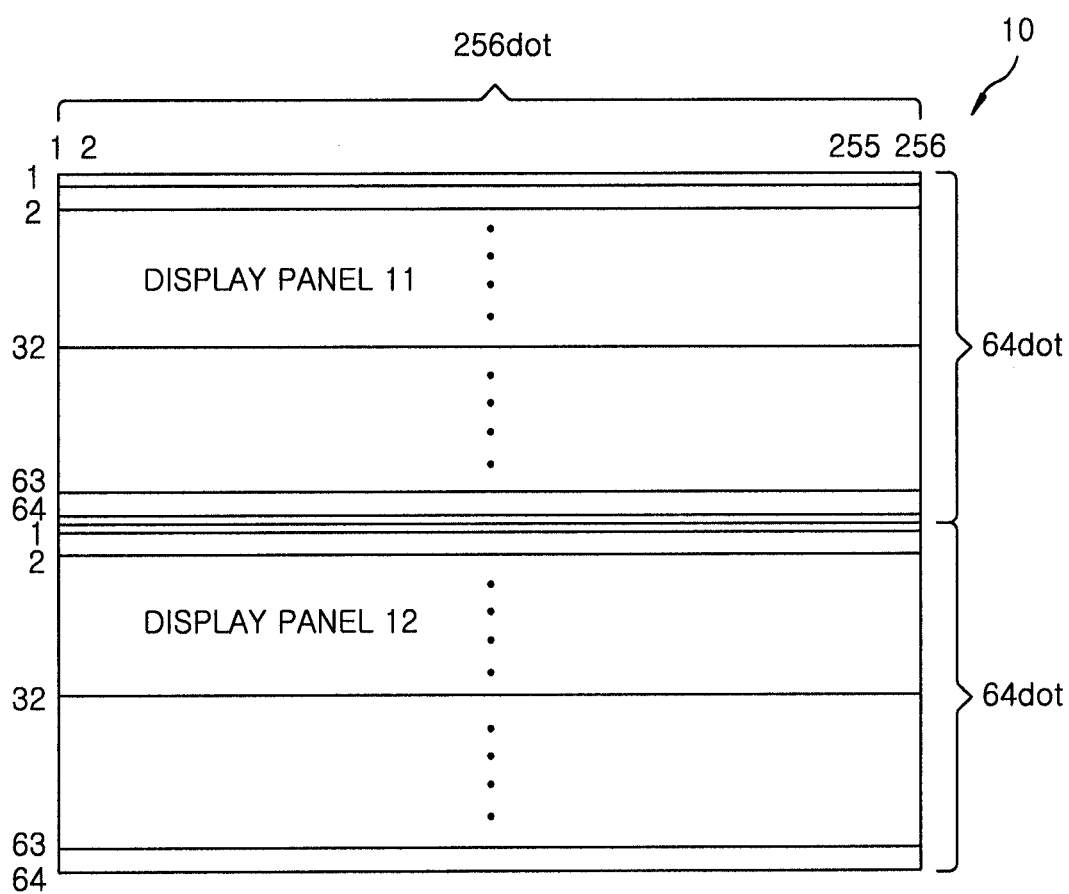
FIG. 1 is a schematic view illustrating the concept of a driving technique in a display device in accordance with a common embodiment of the present invention.

Hereinafter, embodiments of the present invention will now be described in detail with reference to the accompanying drawings which form a part hereof.

A display device in accordance with an embodiment of the present invention includes L number of display panels where L is a positive integer greater than 1; a driving circuit having L number of controllers for driving the respective display panels; and a central control unit configured to control the driving circuit. The controllers are configured to be synchronized with one another based on a clock signal from the central control unit, and each of the controllers is configured to sequentially and continuously select each one of K number of lines (where K is a positive integer greater than 1) arranged in a row in the corresponding display panel, and allow the selected line to emit light. Further, a direction for sequentially and continuously selecting each one of the lines is set to be the same in all the display panels.

Each of the controllers may have a register that specifies one line with a line number for emitting light, and the central control unit may control the controllers to allow the lines having a same number to emit light.

Further, each of the controllers may have a register that specifies one line with a line number for emitting light, and the central control unit may control the controllers connected to the display panels adjacent to each other to allow the lines having different line numbers to emit light.

Further, the respective controllers may have the same configuration. By using the same controller formed as an integrated circuit, it is possible to reduce the number of circuit parts and to save trouble in developing and manufacturing a new integrated circuit in response to an enlargement of display panels. Further, the display panels may be separated from one another. However, display areas may be formed on a single glass substrate, and the display areas may be driven by the controllers, respectively.

Further, the central control unit may control each of the display panels not to emit light at least during a time period corresponding to the scanning of one line after the last one line is scanned in the corresponding display panel.

Common Embodiment

A display device, a driving circuit of the display device and a driving method of the display device in accordance with embodiments will be described below with reference to the accompanying drawings. In first to third embodiments which will be described later, like reference numerals will be given to like parts having substantially the same function and configuration, and a redundant description thereof will be omitted. Further, common parts of the first to third embodiments will be described below by using the expression "a common embodiment".

FIG. 1 is a schematic view of a display panel in a display device in accordance with the common embodiment.

In the display device in accordance with the common embodiment shown in FIG. 1, a display panel 10 is divided into a display panel 11 and a display panel 12 arranged in an up-down direction in FIG. 1 (hereinafter, referred to as the up-down direction). The display panel 11 and the display panel 12 have the same configuration. Specifically, the display panel 11 and the display panel 12 are disposed on a single glass substrate, thereby constituting the display panel 10. Each of the display panels 11 and 12 has 256 dots arranged in the horizontal direction in FIG. 1 (hereinafter, referred to as the horizontal direction), and has 64 dots arranged in the vertical direction in FIG. 1 (hereinafter, referred to as the vertical direction). Dots of 256×64=16384 are arranged on the entire surface of each display panel.

In each of the display panels 11 and 12, each number 1, 2, ..., 63 or 64 denoted at the left end in FIG. 1 (hereinafter, referred to as the left end) is a line number of a line disposed in a row extending in the horizontal direction, and the line number increases from the upper side in FIG. 1 (hereinafter, referred to as the upper side) to the lower side in FIG. 1 (hereinafter, referred to as the lower side). The uppermost line in each of the display panels 11 and 12 has the line number of 1, and the lowermost line in each display panel has the line number of 64. Hereinafter, the line of which the line number is 1 is defined as line 1, and the line of which the line number is 64 is defined as line 64. In general, when m is a positive integer, the line of which the line number is m is defined as line m.

In each of the display panels 11 and 12, each number 1, 2, ..., 255 or 256 denoted at the upper side is a dot number representing the arrangement position of dots arranged in a column in the vertical direction, and the dot number increases from the left side in FIG. 1 (hereinafter, referred to as the left side) to the right side in FIG. 1 (hereinafter, referred to as the right side). The dot disposed at the leftmost side has the dot number of 1, and the dot disposed at the rightmost side has the dot number of 256.

There are provided two kinds of control lines for controlling the luminance of each dot in the display panels 11 and 12 and controlling on/off of light-emission thereof. The control line for controlling the luminance is referred to as a luminance control line, and the control line for controlling the on/off of light-emission is referred to as an on/off control line. If the two control lines, i.e., the luminance control line and the on/off control line are led out for every dot, lead-out lines of 16384×2=32768 are required for each of the display panels 11 and 12. Also, lead-out lines of 32768×2=65536 are required for the two display panels 11 and 12.

However, in each of the display panels 11 and 12, one luminance control line is led out by connecting all the lines for controlling the luminances of 64 dots arranged in a column in the vertical direction in FIG. 1. Thus, 256 luminance control lines are led out from the display panel 11 (see reference numeral '30' of FIG. 2), and 256 luminance control lines are led out from the display panel 12 (see reference numeral '32' of FIG. 2).

Further, in each of the display panels 11 and 12, one on/off control line is led out by connecting all the lines for controlling the on/off of 256 dots arranged in a row in the horizontal direction in FIG. 1. Thus, 64 on/off control lines are led out from the display panel 11 (see reference numeral '31' of FIG. 2), and 64 on/off control lines are led out from the display panel 12 (see reference numeral '33' of FIG. 2).

By using the 256 luminance control lines and the 64 on/off control lines, the luminances of the 256 dots belonging to each line can be independently controlled in each display panel 11 or 12. Further, the line drive previously described is applied to each display panel 11 or 12 in the common embodiment. That is, the 256 dots belonging to each line are configured to simultaneously emit light. In addition, each display panel 11 or 12 is controlled so that light-emission is sequentially performed for every one of the 64 lines and when any one line emits light, the other lines emit no light.

In the display panel 10, both one line of the display panel 11 and one line of the display panel 12 simultaneously emit light so that the duty cycle may be doubled. That is, by using the visual afterimage phenomenon happening to a person who observes the display panel 10 with the naked eye, the luminance of an image displayed on the display panel 10 may be doubled even though the dots on each line have the same luminance level.

Here, a mutual positional relationship between one line of the display panel 11 and one line of the display panel 12 is controlled in various manners.

Figure 2:
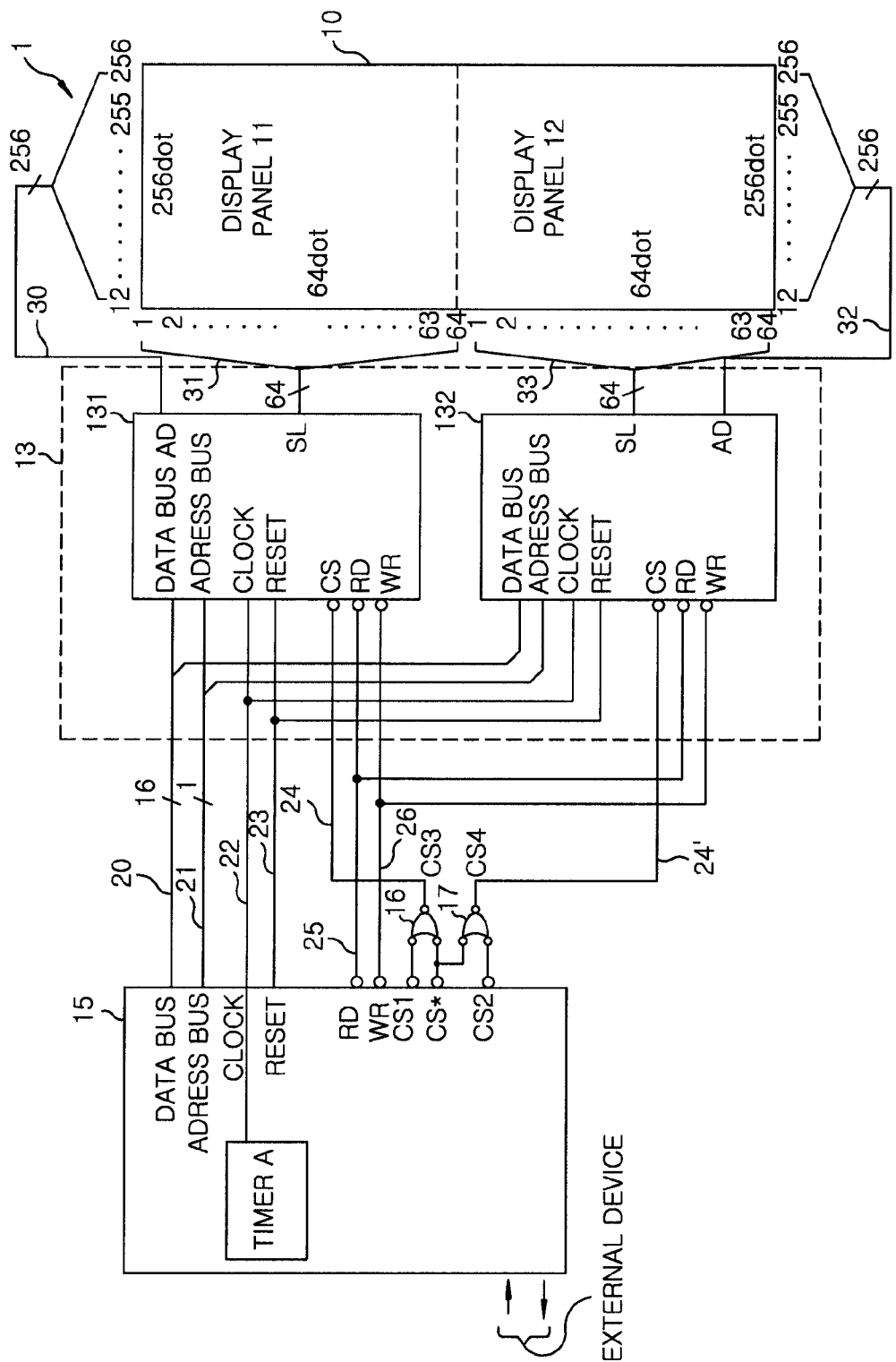
FIG. 2 is a schematic view of main pats of the display device in accordance with the common embodiment.

FIG. 2 is a schematic view of main parts of the display device in accordance with the common embodiment. First, the principle of the common embodiment, which is a common part of all the first to third embodiments except a chip select part, will be described.

A display device 1 shown in FIG. 2 includes the display panel 10 (see FIG. 1), and a driving circuit 13 for controlling the display panel 10, a central processing unit (CPU) 15 that functions as a central control unit controlling the driving circuit 13, a gate 16, and a gate 17. The driving circuit 13 is configured to include a controller 131 and a controller 132. The controllers 131 and 132 have the same configuration.

A data bus terminal, an address bus terminal, a clock terminal, a reset terminal, a read terminal RD and a write terminal WR of the central processing unit (CPU) 15 are connected to those of each of the controller 131 and 132.

In addition, the controller 131 is connected to the display panel 11, and the controller 132 is connected to the display panel 12.

Further, in the second embodiment which will be described later, a chip select terminal CS of the controller 131 is connected to the gate 16, and a chip select terminal CS of the controller 132 is connected to the gate 17. Each gate 16 or 17 is an NOR gate. The chip select terminal CS of the controller 131 is connected to a chip select terminal CS3, which is an output terminal of the gate 16, through a chip select line 24. The chip select terminal CS of the controller 132 is connected to a chip select terminal CS4, which is an output terminal of the gate 17, through the chip select line 24'. In the third embodiment, the central processing unit 15 have no common chip select terminal CS*, which will be described later, and the gates 16 and 17 are not provided.

The first embodiment has a configuration same as those in the second embodiment in which the gates 16 and 17 are provided and the central processing unit 15 is provided with the common chip select terminal CS*. However, since the signal from the common chip select terminal CS* is described to have H level (high level) (see FIG. 5), it is substantially same as the case where the gates 16 and 17 are not provided.

The data bus terminal of the controller 131 is connected to a data bus terminal of the central processing unit 15 through a data bus 20. The address bus terminal of the controller 131 is connected to an address bus terminal of the central processing unit 15 through an address bus 21. The data bus 20 is a digital bus and has a bus width of 16 bits. The address bus 21 is a digital bus and has a bus width of 1 bit.

In addition, the clock terminal of the controller 131 is connected to a clock terminal of the central processing unit 15 through a clock line 22. The reset terminal of the controller 131 is connected to a reset terminal of the central processing unit 15 through a reset line 23. The read terminal RD of the controller 131 is connected to a read terminal RD of the central processing unit 15 through a read line 25. The write terminal WR of the controller 131 is connected to a write terminal WR of the central processing unit 15 through a write line 26.

The controller 131 is connected to the display panel 11 through a luminance control line 30. The luminance control line 30 has the 256 luminance control lines connected to AD terminals AD of the controller 131. Inside of the display panel 11, each of the 256 luminance control lines is connected to 64 dots included in the corresponding luminance control line (see FIG. 2). Alternatively, each of the 256 luminance control lines is connected to a control terminal of a luminance control element (not shown) for controlling the luminances of the 64 dots. Dot luminance signals respectively corresponding to the luminances of the 256 dots belonging to one line to be displayed are outputted from the AD terminals AD of the controller 131.

The controller 131 is connected to the display panel 11 through the on/off control line 31. The on/off control line 31 has 64 on/off control lines connected to line select terminals SL of the controller 131. Inside of the display panel 11, each of the 64 on/off control lines of the on/off control line 31 is connected to an on/off control electrode (not shown) or a control terminal of an on/off control element (not shown) for controlling the on/off of the light-emission of first to 256th dots (see FIG. 2) in the extending direction of the corresponding line of the display panel 11. A signal indicative of turning-on of the light-emission or a signal indicative of turning-off of the light-emission is outputted from the line select terminal SL of the controller 131. Here, turning on the light-emission means that the light-emission is performed, and turning off the light-emission means that the light-emission is not performed.

The data bus terminal of the controller 132 is connected to the data bus terminal of the central processing unit 15 through the data bus 20. The address bus terminal of the controller 132 is connected to the address bus terminal of the central processing unit 15 through the address bus 21.

The clock terminal of the controller 132 is connected to the clock terminal of the central processing unit 15 through the clock line 22. The reset terminal of the controller 132 is connected to the reset terminal of the central processing unit 15 through the reset line 23. The read terminal RD of the controller 132 is connected to the read terminal RD of the central processing unit 15 through the read line 25. The write terminal WR of the controller 132 is connected to the write terminal WR of the central processing unit 15 through the write line 26.

The controller 132 is connected to the display panel 12 through a luminance control line 32. The luminance control line 32 has 256 luminance control lines connected to AD terminals AD of the controller 132. Inside of the display panel 12, each of the 256 luminance control lines is connected to 64 dots included in the corresponding luminance control line (see FIG. 2). Alternatively, each of the 256 luminance control lines is connected to a control terminal of a luminance control element (not shown) for controlling the luminances of the 64 dots. Dot luminance signals respectively corresponding to the luminances of the 256 dots belonging to one line to be displayed are outputted from the AD terminals AD of the controller 132.

The controller 132 is connected to the display panel 12 through the on/off control line 33. The on/off control line 33 has 64 on/off control lines connected to line select terminals SL of the controller 132. Inside of the display panel 12, each of the 64 on/off control lines of the on/off control line 33 is connected to an on/off control electrode (not shown) or a control terminal of an on/off control element (not shown) for controlling the on/off of the light-emission of first to 256th dots (see FIG. 2) in the extending direction of the corresponding line of the display panel 12. A signal indicative of turning-on of the light-emission or a signal indicative of turning-off of the light-emission is outputted as a binary signal from the line select terminal SL of the controller 132.

The central processing unit 15 that functions as the central control unit is connected to the controllers 131 and 132 included in the driving circuit 13. In addition, the central processing unit 15 is connected to an external device (not shown) that functions as a host device. The central processing unit 15 has a timer A that is a first hardware timer. The timer A is configured to have a programmable counter that counts the number of clocks generated in the central processing unit 15 and resets the count value when the count value reaches a predetermined count number. The predetermined count number of the programmable counter is appropriately set by a program executed in the central processing unit 15. The signal outputted from the timer A is outputted from the clock terminal of the central processing unit 15 and used as a clock signal of each of the controllers 131 and 132. If the count value of the programmable counter is equal to or greater than half or more of the predetermined value, the polarity of the clock signal is reversed in order that a ratio of high and low levels of the clock signal of the controllers 131 and 132 becomes close to 1:1.

The display device in accordance with the common embodiment is characterized in that the controllers 131 and 132 operate in synchronization with each other. Here, the controllers 131 and 132 have the same configuration, and therefore, the operations of the controllers are basically identical to each other. Further, the clock terminals of the controllers 131 and 132 having the same configuration are connected to each other, so that a common clock is inputted to the clock terminals to thereby obtain clock-based synchronization of the controllers 131 and 132.

A difference between the operations of the controllers 131 and 132 is caused merely by a difference between the signals applied to both the chip select terminals CS. Thus, various types of controls can be performed by determining at which timing an active low first chip select signal is applied to the chip select terminal CS of the controller 131 and at which timing an active low second chip select signal is applied to the chip select terminal CS of the controller 132.

When the active low write signal outputted from the write terminal WR of the central processing unit 15 has an L level (low level), each of the controllers 131 and 132 is set in a write mode in which a 16-bit signal carried on the data bus 20 is received to a register (not shown) and a memory (not shown) inside of each controller. Here, a command signal or a data signal is selected by a 1-bit signal carried on the address bus 21. If the command signal is selected, the command signal is received to the register. If the data signal is selected, the data signal is received to the memory.

Figure 3A:
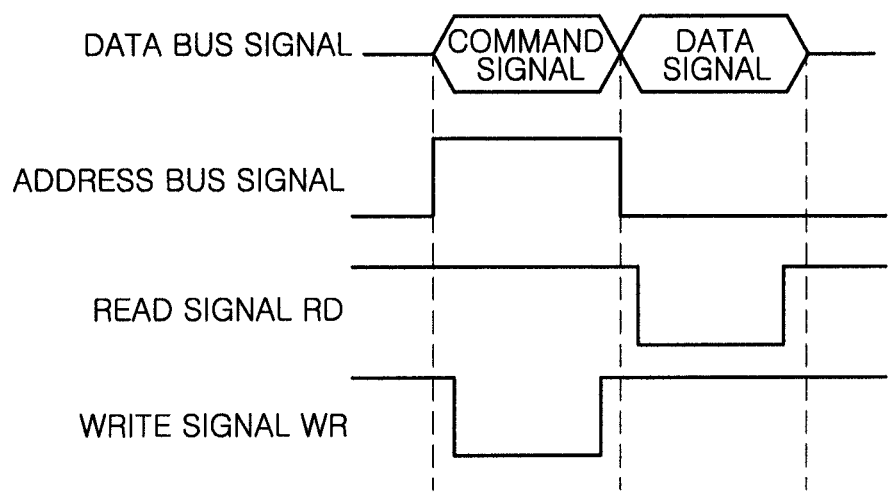
FIGS. 3A and 3B show the exchange of signals between a central processing unit and a controller in accordance with the common embodiment.
Figure 3B:
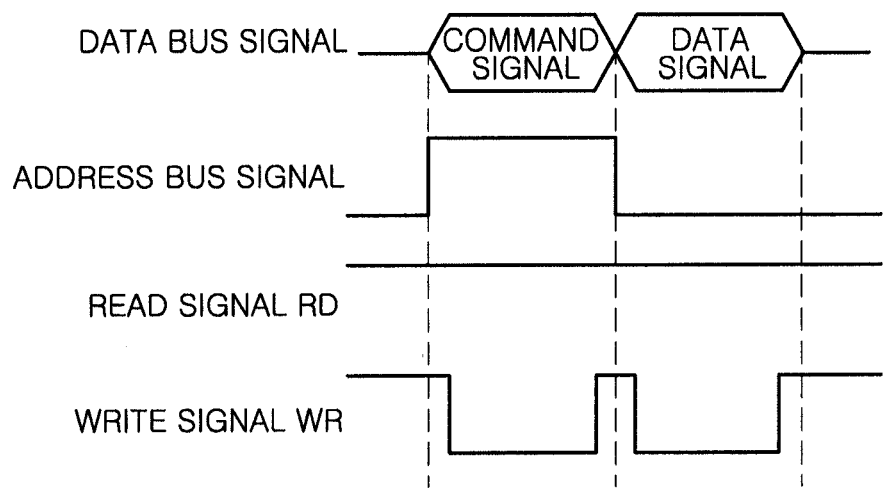

FIGS. 3A and 3B show the exchange of signals between the central processing unit 15 and the controllers 131 and 132. FIG. 3A illustrates the operation when the central processing unit 15 reads out data from the controllers 131 and 132, and FIG. 3B illustrates the operation when the central processing unit 15 writes data in the controllers 131 and 132.

The operation when the central processing unit 15 reads out data will be described with reference to FIG. 3A. When the address bus signal has an H level (high level), a command signal for each of the controllers 131 and 132 is outputted from the central processing unit 15. When the write signal outputted from the write terminal WR has an L level (low level), each of the controllers 131 and 132 recognizes that the data bus signal carried on the data bus 20 by the central processing unit 15 is the command signal, and receives the command signal. When the address bus signal has a L level (low level) and the read signal outputted from the read terminal RD has an L level (low level), each of the controller 131 and 132 carries on the data bus 20 a data signal instructing the command signal to be carried on the data bus 20, and the central processing unit 15 receives the data signal.

The operation when the central processing unit 15 writes data will be described with reference to FIG. 3B. When the address bus signal has an H level, a command signal for each of the controllers 131 and 132 is outputted from the central processing unit 15. When the write signal outputted from the write terminal WR has an L level (low level), each of the controllers 131 and 132 recognizes that the data bus signal carried on the data bus 20 by the central processing unit 15 is the command signal, and receives the command signal.

When the address bus signal has an L level and the write signal outputted from the write terminal WR has an L level, each of the controllers 131 and 132 recognizes that the data bus signal carried on the data bus 20 by the central processing unit 15 is the data signal, and receives the data signal. The data signal received by the controllers 132 and 132 may include a luminance data signal of an image displayed on the display panels 11 and 12.

The luminance data signal is a digital signal for controlling the dot luminance of each dot. The signal, which corresponds to the luminance data signal and is outputted to the display panel, is a dot luminance signal. The command signal is a signal for various instructions from the central processing unit 15 to the controller. For example, the command signal is a digital signal for specifying the type of control of the controller.

As shown in FIG. 3A, the central processing unit 15 outputs the read signal having L level from the read terminal RD, thereby obtaining the data signals including various types of information from the controllers 131 and 132. However, detail description thereof will be omitted since such function is not necessary in describing the embodiments.

Each of the controllers 131 and 132 may be initialized by a reset signal outputted from the reset terminal of the central processing unit 15. The initialization of the controller means that the register (not shown) inside of the controller is cleared, and the value of the memory inside of the controller is set to zero. Accordingly, zero reset can be performed by completely blocking the operations of the controllers 131 and 132 from their previous states.

Each of the controllers 131 and 132 outputs dot luminance signals, each of which is a signal corresponding to the luminance data signal, to the 256 AD terminals AD, and supplies the dot luminance signals to each of the luminance control lines 30 and 32.

Each of the controllers 131 and 132 has the 64 line select terminals SL and outputs 64 line select signals. The line select signal selects one of the lines to be scanned. Here, the term "scanning" means that respective 256 dots belonging to one line simultaneously emit light with dot luminances corresponding to the dot luminance signals, except dummy scanning described later.

The dot luminance signals outputted from the 256 AD terminals AD of the controller 131 and the line select signals outputted from the 64 line select terminals SL of the controller 131 are supplied in synchronization to the display panel 11. The contents of the dot luminance signals outputted from the 256 AD terminals AD are changed whenever one line is selected by each line select signal outputted from the line select terminals SL, thereby sequentially displaying an image for each line. Accordingly, an observer recognizes an upper image in one frame with the naked eye through the afterimage caused when images for the 64 lines are sequentially displayed on the display panel 11.

Further, the dot luminance signals outputted from the 256 AD terminals AD of the controller 132 and the line select signals outputted from the 64 line select terminals SL of the controller 132 are supplied in synchronization to the display panel 12. The contents of the dot luminance signals outputted from the 256 AD terminals AD are changed whenever one line is selected by each line select signal outputted from the line select terminals SL, thereby sequentially displaying an image for every one line. Accordingly, the observer with the naked eye recognizes a lower image in the frame with the naked eye through the afterimage caused when images for the 64 lines are sequentially displayed on the display panel 12.

The clock outputted from the central processing unit is used as the internal clock for operating controller hardwares in the controller 131.

The configuration of the display device in accordance with the common embodiment and the operation of each part in the display device have been described. In this common embodiment, each part is configured to enable the synchronization control of the controllers. The most basic type of scanning by using the two controllers, i.e., the controllers 131 and 132 will first be described with reference to FIGS. 4A and 4B.

Figure 4A:
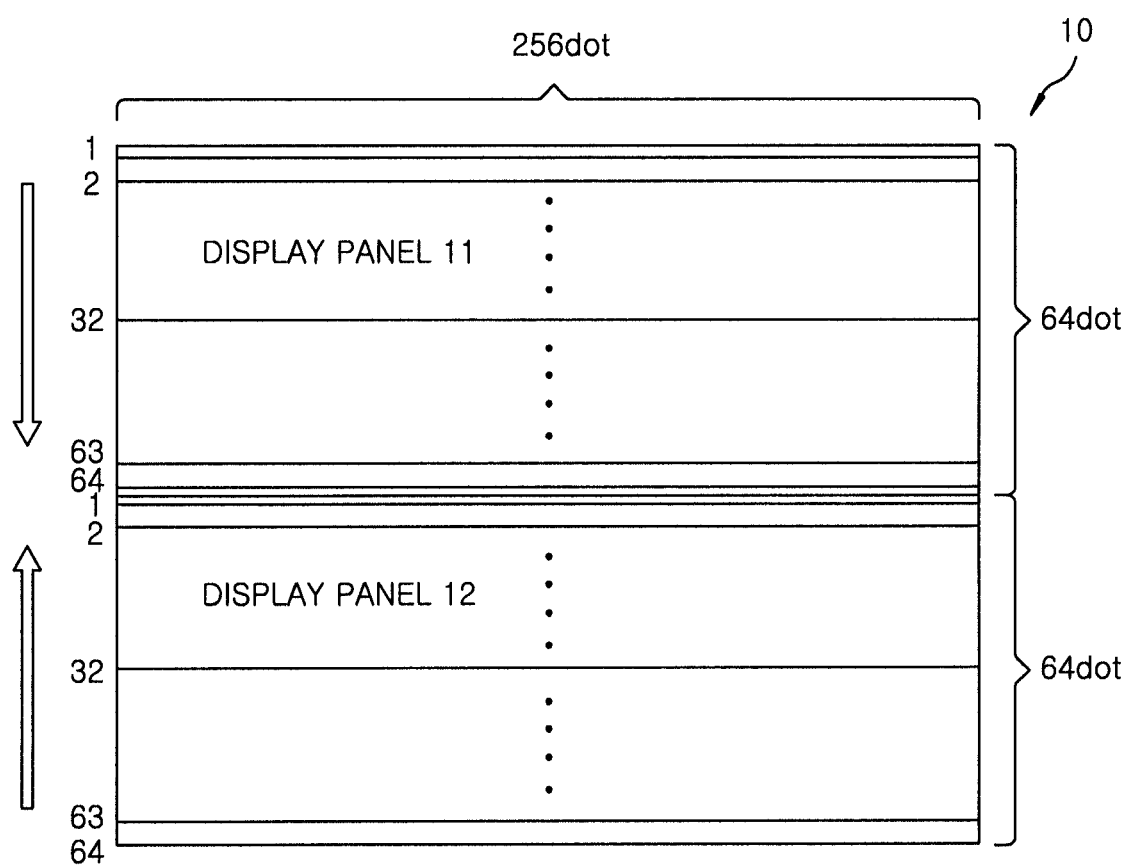
FIGS. 4A and 4B show the principle of synchronization of two controllers in accordance with the common embodiment.
Figure 4B:
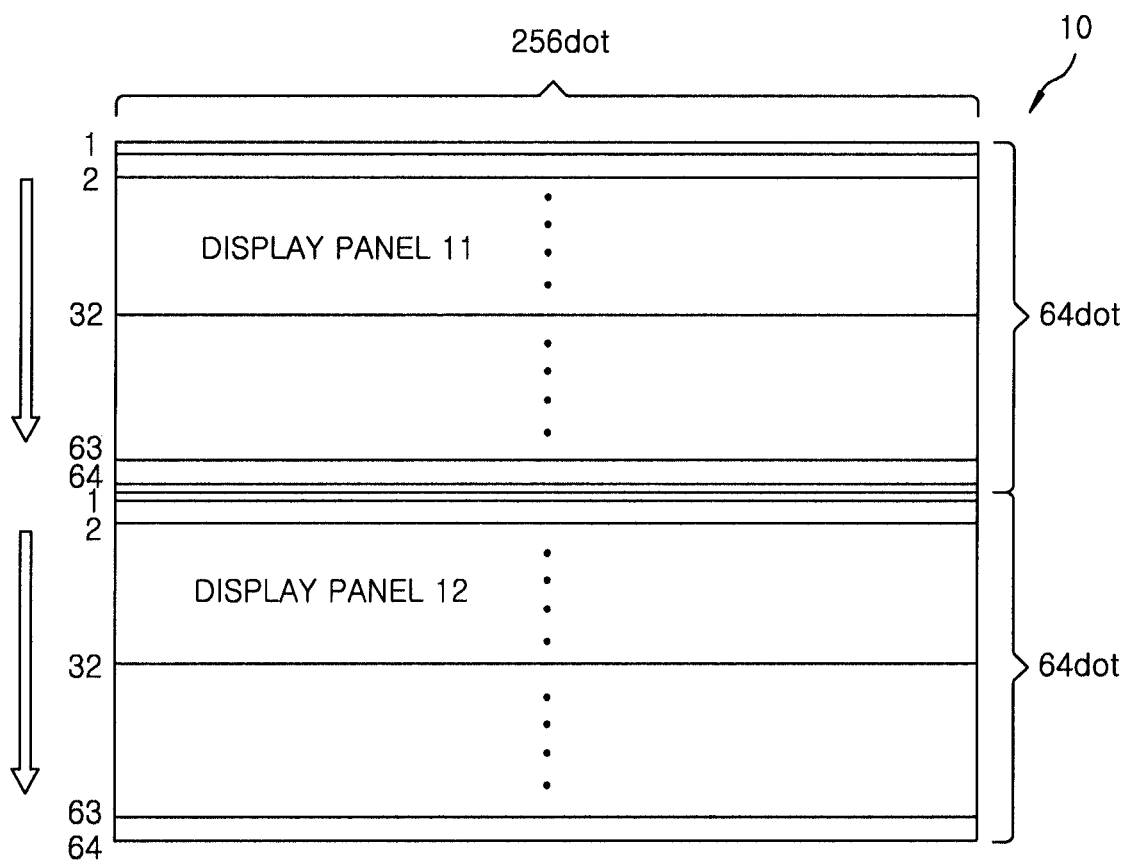

FIGS. 4A and 4B show the principle of synchronization of the two controllers.

FIGS. 4A and 4B schematically illustrate the type of scanning of the controller 131 for controlling the display panel 11 and the controller 132 for controlling the display panel 132. In FIGS. 4A and 4B, the directions of arrows indicate the scanning directions.

In a reverse scanning that is a type of scanning shown in FIG. 4A, when the controller 131 (not shown in FIGS. 4A and 4B) scans the line 1 in the display panel 11, the controller 132 (not shown in FIGS. 4A and 4B) scans the line 64 in the display panel 12.

Next, when the controller 131 scans the line 2 in the display panel 11, the controller 132 scans the line 63 in the display panel 12.

Accordingly, through the sequential scanning, when the controller 131 scans the line 64 in the display panel 11, the controller 132 scans the line 1 in the display panel 12. Subsequently, when the controller 131 scans the line 1 in the display panel 11 again, the controller 132 scans the line 64 in the display panel 12, and then, the scanning operation as described above is repeated. In the scanning shown in FIG. 4A, the scanning direction of the display panel 11 and the scanning direction of the display panel 12 are reverse to each other, and therefore, such a type of scanning is referred to as the reverse scanning as described above.

According to the reverse scanning, in a case where the number of dots in the display panel is doubled, two controllers having the same configuration are provided accordingly, and the two controllers are operated in synchronization with each other, thereby driving the larger-sized display panel 10 including the display panels 11 and 12. Simultaneously, it is possible to simplify the driving circuit 13 (see FIG. 2) and to decrease the luminance of dots while increasing the luminance of an image displayed, thereby extending the lifespan of the display panel.

However, in the reverse scanning shown in FIG. 4A, the interference between lines may occur to make it difficult to obtain the high quality of an image.

In the scanning shown in FIG. 4A, since when the controller 131 scans the line 64 in the display panel 11, the controller 132 scans the line 1 in the display panel 12, the two light emitting lines come closest to each other. In general, the display panel has the phenomenon that if there is a light emitting region, a region adjacent thereto also emits light in the display panel. In this common embodiment, since the light-emission is performed for every one line in each of the display panel 11 and the display panel 12, if there is a light emitting line, a different light emitting line adjacent thereto may be also influenced, thereby generating interference between the neighboring light emitting lines.

The present inventors have found that such interference between lines occurs particularly when OLEDs are used. The present inventors have also found that such interference significantly occurs when the interval between two light emitting lines in the OLED is within a range of 10 lines. That is, the two light emitting lines have significant influence on each other from a time when the line 60 in the display panel 11 and the line 5 in the display panel 12 emit light to a time when the line 64 in the display panel 11 and the line 1 in the display panel 12 emit light, whereby the two lines abnormally emit light. As a result, the quality of a displayed image is degraded (display defect), and the observer with the naked eye feels uncomfortable.

The present inventors consider that the reason why the display defect occurs in the OLED is as follows. In the wiring configuration having narrow gaps, lines connecting dots are arranged in parallel with one another. The magnitude of current for driving is relatively large in the OLED. Induction is generated by the influence of a current magnetic field/crosstalk. An electro luminescence (EL) element has a large change in luminance with respect to a change in current, and responds at a high speed. Particularly in the OLED, the present inventors suppose that when two active scans approach each other, i.e., when two light emitting lines approaches each other, interference therebetween occurs and a change in luminance occurs.

In equidirectional scanning that is a type of scanning shown in FIG. 4B, when the controller 131 scans the line 1 in the display panel 11, the controller 132 scans the line 1 in the display panel 12.

Next, when the controller 131 scans the line 2 in the display panel 11, the controller 132 scans the line 2 in the display panel 12.

Accordingly, through the sequential scanning, when the controller 131 scans the line 64 in the display panel 11, the controller 132 scans the line 64 in the display panel 12. Then, when the controller 131 scans the line 1 in the display panel 11 again, the controller 132 scans the line 1 in the display panel 12, and then, the scanning operation as described above is repeated.

Thus, in a case where the equidirectional scanning performs a predetermined operation as described above, one line belonging to the display panel 11 scanned (emitting light) and one line belonging to the display panel 12 scanned (emitting light) are spaced apart from each other by lines. In the scanning shown in FIG. 4B, the scanning direction of the display panel 11 and the scanning direction of the display panel 12 are identical to each other, and therefore, the scanning is referred to as the equidirectional scanning as described above.

That is, in the scanning shown in FIG. 4B, it is not required to develop a new driving circuit such as a significant change in the configuration of hardware even when the number of dots in a display panel to be driven increases or decreases. Further, it is possible to display an image without any interference between lines while extending the lifespan of the display panel.

However, the problem of interference between two lines may not be solved merely by employing the principle of the equidirectional scanning as described above. This is because the initial setting of scan start cannot be simultaneously performed on two or more controllers.

(First Embodiment)

Figure 5:
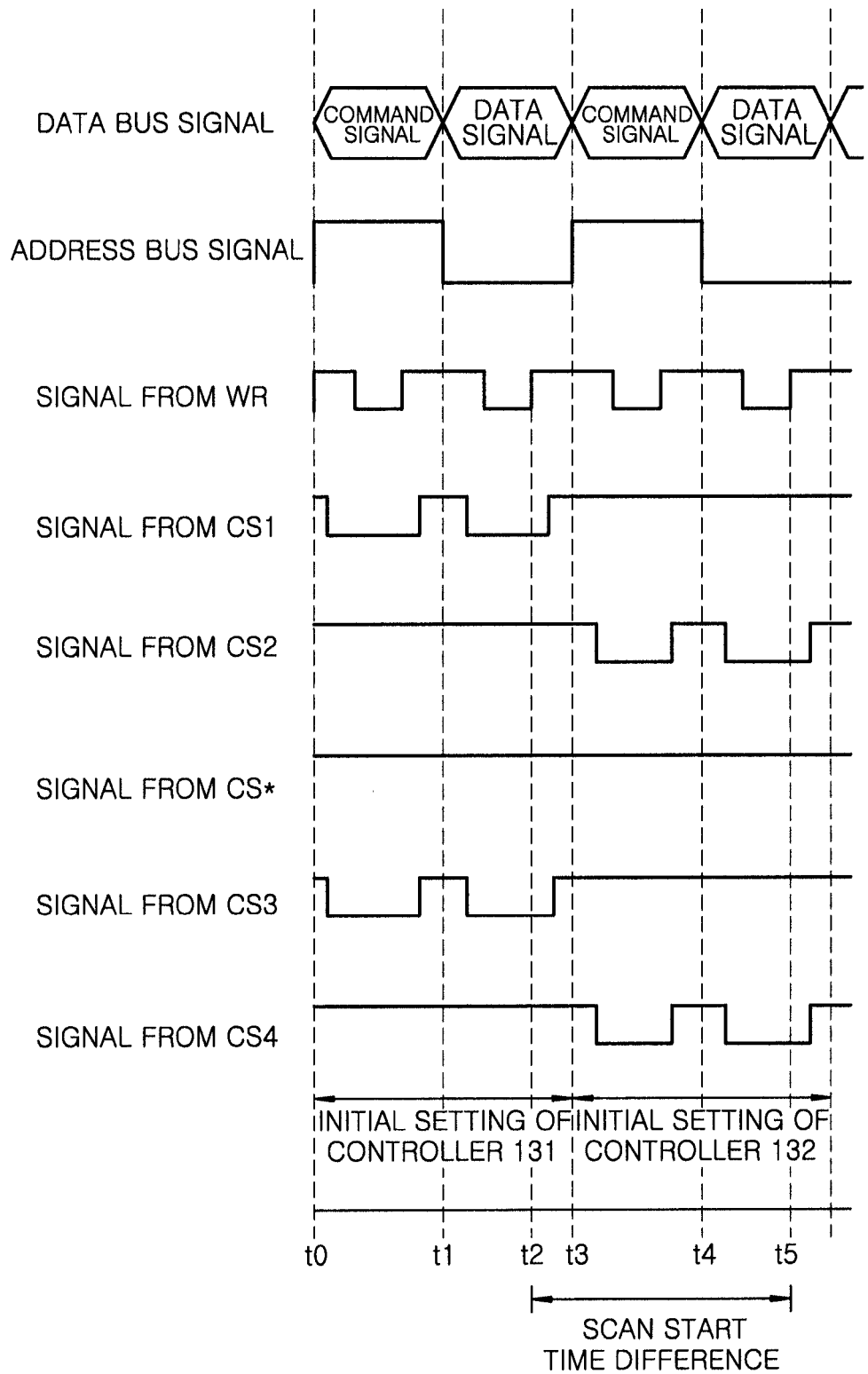
FIG. 5 is a timing diagram illustrating the operation of a display device in accordance with a first embodiment.

FIG. 5 is a view illustrating the problem in the principle of the equidirectional scanning in accordance with a first embodiment.

FIG. 5 is a timing diagram showing a timing of the initial setting of the controller 131 and a timing of the initial setting of the controller 132. As shown in FIG. 5, the central processing unit 15 generates a data bus signal, an address bus signal, a signal from the write terminal WR, a signal from the chip select terminal CS1, a signal from the chip select terminal CS2, and a signal from the common chip select terminal CS*. Further, the gates 16 and 17 generate a signal from the chip select terminal CS3 and a signal from the chip select terminal CS4, respectively. Although not shown, a signal from the read terminal RD has an H level, and a clock signal is outputted from the clock terminal. The initial setting of the controller 131 and the initial setting of the controller 132 are executed based on these signals. Here, a scan start instruction for the controller 131 is written at time t2, and a scan start instruction for the controller 132 is written at time t5.

In order to compare the operation in the first embodiment with the operation in the second embodiment, it has been described in FIG. 5 that the signal having an H level is always outputted from the common chip select terminal CS*. However, in the first embodiment, the central processing unit 15 may not have the common chip select terminal CS*. In this case, the gates 16 and 17 are not provided. In addition, the chip select terminal CS of the controller 131 is connected to the chip select terminal CS1 of the central processing unit 15, and the chip select terminal CS of the controller 132 is connected to the chip select terminal CS2 of the central processing unit 15.

In the first embodiment, the scanning in the display panel 11 is started at time t2 at which the scan start instruction for the controller 131 is written, and the scanning in the display panel 12 is started at time t5 at which the scan start instruction for the controller 132 is written.

The reason why the scan start time in the display panel 11 is different from the scan start time in the display panel 12 will be described in detail. The first chip select signal, outputted from the chip select terminal CS1 of the central processing unit 15 and inputted to the controller 131 through the gate 16, and the second chip select signal, outputted from the chip select terminal CS2 of the central processing unit 15 and inputted to the controller 132 through the gate 17, are independently supplied. Since the software of the central processing unit 15 is processed step by step, the first and second chip select signals cannot be simultaneously generated as shown in FIG. 5.

Since there is the time difference between time t2 and time t5, the line to be scanned in the display panel 11 and the line to be scanned in the display panel 12 may come close to each other during that time period. Since the time difference is shorter than that required to scan one line, it is hardly possible to observe such time difference with the naked eye. However, it is preferable not to have such time difference. For example, unlike that described above, in a case where the scan start instruction for the controller 132 is written at time t2, and the scan start instruction for the controller 131 is written at time t5, there may be a problem in that when the controller 131 scans the line 64 in the display panel 11, the controller 132 scans the line 1 in the display panel 12. Accordingly, although it is a short time, the degradation of the image quality may occur in the display panel 10.

Hereinafter, a distinguishing scanning technique in accordance with the second embodiment will be described in order to solve the problem that the time difference exists in the equidirectional scanning.

(Second Embodiment)

A display device in accordance with the second embodiment will be described. In the display device 1 of the second embodiment shown in FIG. 2, the first chip select terminal CS1 of the central processing unit 15 is connected to a first input terminal of the gate 16, and the common chip select terminal CS* of the central processing unit 15 is connected to a second input terminal of the gate 16. Further, the second chip select terminal CS2 of the central processing unit 15 is connected to a first input terminal of the gate 17, and the common chip select terminal CS* of the central processing unit 15 is connected to a second input terminal of the gate 17. The display device in accordance with the second embodiment is characterized in a chip select signal output from the common chip select terminal CS* and in the content of a command signal in the initial setting.

Figure 6:
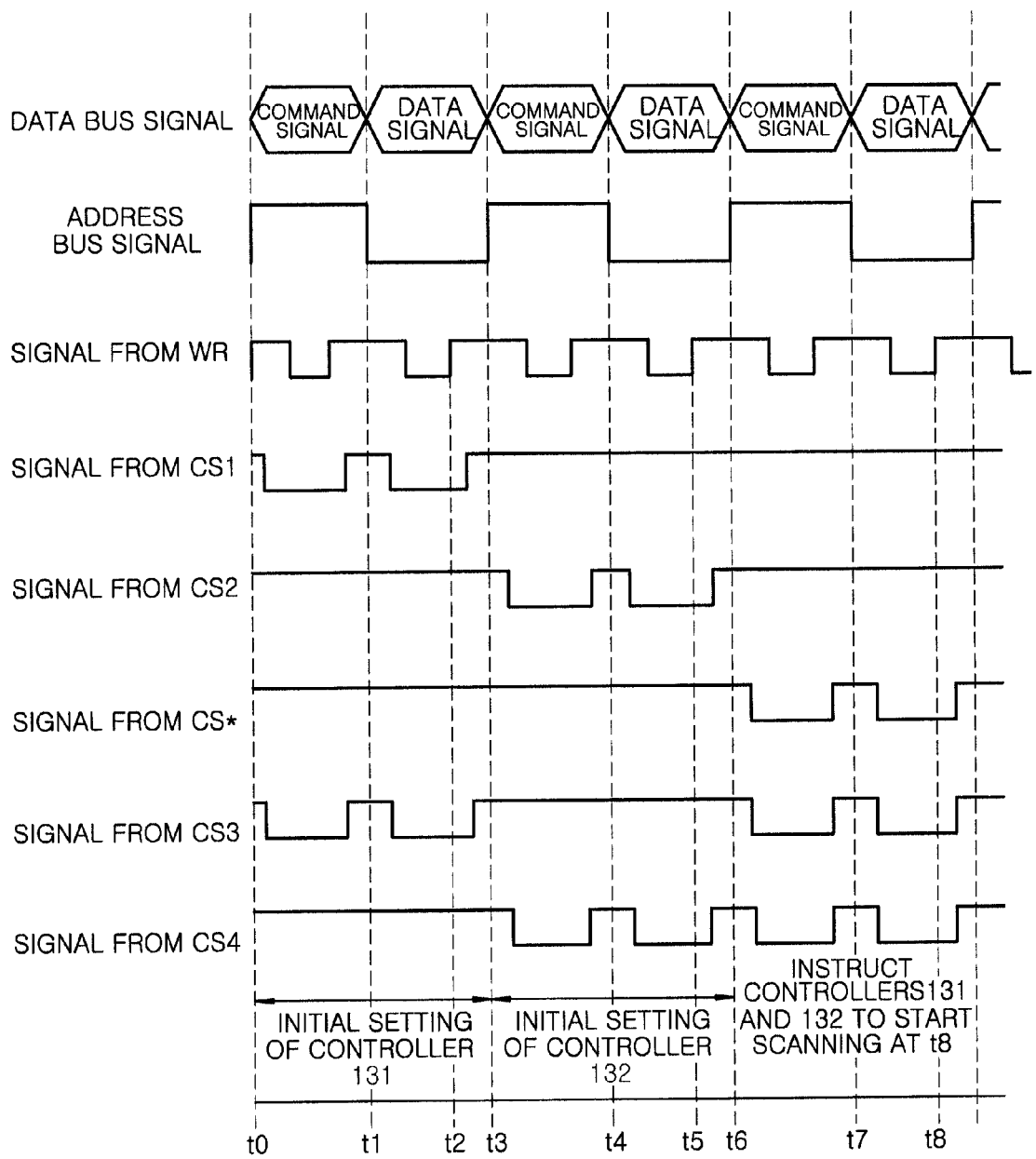
FIG. 6 is a timing diagram illustrating the operation of a display device in accordance with a second embodiment.

FIG. 6 is a timing diagram illustrating the operation of the display device in accordance with the second embodiment. The type of scanning performed in the display device 1 of the second embodiment shown in FIG. 2 will be described with reference to FIG. 6.

Respective signals of the vertical axis in FIG. 6 will be described below. The horizontal axis indicates time.

As shown in FIG. 6, the central processing unit 15 generates a data bus signal, an address bus signal, a signal from the write terminal WR, a signal from the chip select terminal CS1, a signal from the chip select terminal CS2, and a signal from the common chip select terminal CS*. Further, the gates 16 and 17 generate a signal from the chip select terminal CS3 and a signal from the chip select terminal CS4, respectively. Although not shown, the signal from the read terminal has an H level. The initial setting of the controller 131 and the initial setting of the controllers 132 are executed based on these signals. Here, the initial setting of the controller 131 is written at time t2, and the initial setting of the controller 132 is written at time t5. After the initial settings of the controllers 131 and 132 are completed, the controllers 131 and 132 receive command signals of writing the scan start instructions at time t6.

Here, each of the initial setting of the controller 131, which is instructed by a command signal outputted between time t0 and time t1, and the initial setting of the controller 132, which is instructed by a command signal outputted between time t3 and time t4, includes, e.g., the content of selecting a line to be scanned first, and the like. The scanning operation of the controllers 131 and 132 may not be started yet during the initial setting operation. The controllers 131 and 132 receive outputted command signals each having the scan start instruction between time t6 and t7, and the scan start instructions are simultaneously written at time t8. Further, at time t8 at which the scan start instructions are simultaneously written, the controller 131 starts the operation of scanning in the display panel 11, and the controller 132 starts the operation of scanning in the display panel 12.

Accordingly, in the second embodiment, the scan start time in the display panel 11 and the scan start time in the display panel 12 are identical to each other. Thus, it is possible to solve the problem of the first embodiment that the line to be scanned in the display panel 11 and the line to be scanned in the display panel 12 may come close to each other and the image quality is degraded.

(Third Embodiment)

Figure 7:
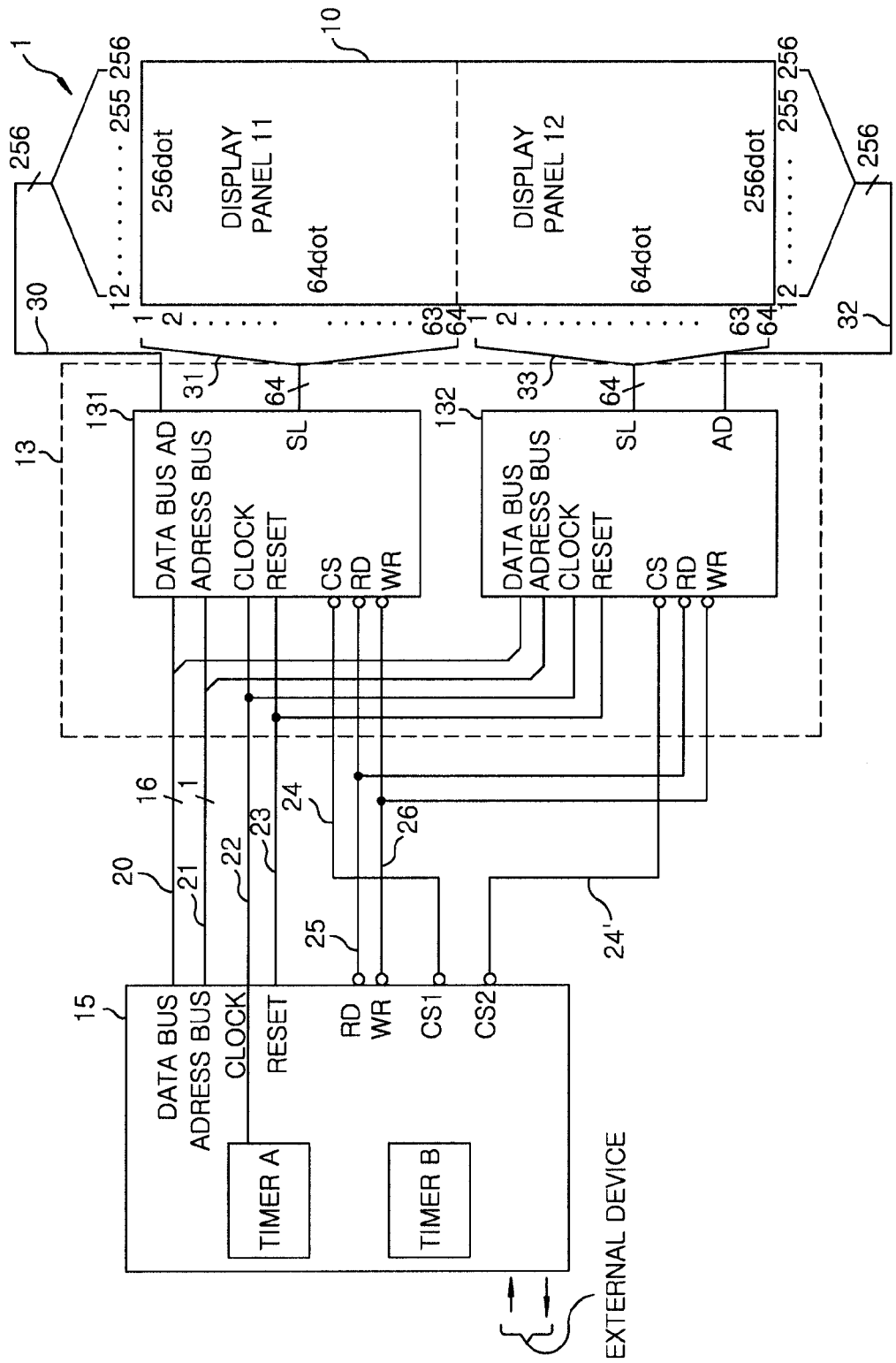
FIG. 7 is a schematic view illustrating main parts of a display device in accordance with a third embodiment.

FIG. 7 is a schematic view illustrating main parts of the display device in accordance with the third embodiment. A display device 2 shown in FIG. 7 is different from the display device 1 of the second embodiment in that the display device 1 is provided with the gates 16 and 17 while the display device 2 is provided with no such gates. The chip select terminal CS of the controller 131 is connected to the chip select terminal CS1 of the central processing unit 15, and the chip select terminal CS of the controller 132 is connected to the chip select terminal CS2 of the central processing unit 15. Moreover, the display device 2 is different from the display device 1 in that the central processing unit 15 further includes a timer B.

As a modification of the third embodiment for performing the same operation, the central processing unit 15 may include the common chip select terminal CS* and a signal having an H level is outputted therefrom by using the gates 16 and 17 as in the second embodiment, and the central processing unit 15 may further include the timer B. The other parts are common in the embodiment, and therefore, their detailed descriptions will be omitted.

Figure 8:
FIG. 8 is a timing diagram illustrating the operation of the display device in accordance with the third embodiment.

The timer B is a hardware counter for managing a time difference between a time at which the initial setting of the controller 131 for controlling the display panel 11 is completed (see time t3 of FIG. 8) and a time at which the initial setting of the controllers 132 for controlling the display panel 12 is started (see time t9 of FIG. 8). The timer B is a hardware counter that performs a count-up operation in synchronization with the clock of the central processing unit 15.

FIG. 8 is a timing diagram illustrating the operation of the display device 2 in accordance with the third embodiment. The scanning operation performed in the display device 2 of the third embodiment shown in FIG. 7 will be described with reference to FIG. 8.

Respective signals of the vertical axis in FIG. 8 will be described below. The horizontal axis indicates time. The section between time t3 and time t9 is omitted.

As shown in FIG. 8, the central processing unit 15 generates a data bus signal, an address bus signal, a signal from the write terminal WR, a signal from the chip select terminal CS1, a signal from the chip select terminal CS2, and a count value of the timer B. The count value of the timer B is used within the central processing unit 15, and is not outputted to the outside of the central processing unit 15.

The scan start instructions for the controllers 131 and 132 are written based on these signals. The initial setting of the controller 131 is set from time t0 to time t3, and the initial setting of the controller 132 is set from time t9 to time t12. The scan start instruction for the controller 131 is written at time t2, and the scan start instruction for the controller 132 is written at time t11. In FIG. 8, the signals between time t3 and time t9 are omitted, and the count value of the timer B increases in proportion to the lapse of the time from time t3.

In the third embodiment, a time difference between time t3 and time t9 is controlled by using the timer B. The timer B starts counting after the controller 131 executes the instruction to start scanning at time t2 and the initial setting operation of the controller 131 is completed at time t3. At time t9 at which the count value of the timer B reaches a predetermined value, the initial setting operation of the controller 132 is started.

Here, the time duration from time t3 to time t9 can be set to correspond to the arbitral number of clocks depending on the count value of the timer B. The time duration from time t3 to time t9 is set in advance to be {(scanning time of one frame× n)+shift amount}, so that it is possible to manage the time at which the scan start instruction for the controller 131 is written and the time at which the scan start instruction for the controller 132 is written. Here, n is an arbitrary positive integer, and "scanning time of one frame×n" is counted by a unit of the scanning time of one frame. The shift amount is counted by a unit of clock cycle. Here, the one frame is one screen and corresponds to 64 lines in the embodiment.

In the third embodiment, a time difference between the time at which at which the scan start instruction for the controller 131 is written and the time at which the scan start instruction for the controller 132 is written is set to "scanning time of one frame×n," to thereby sufficiently absorb an operational time delay caused in the controller. Further, the "shift amount" is set, for example, to 32 lines that is a half of the 64 lines. By setting the shift amount to the 32 lines, even though there occurs a digital error corresponding to one clock of the clock signal from the clock terminal between the controller 131 and the controller 132 configured differently in hardware, it is possible to secure a sufficient distance between the line to be scanned in the display panel 11 driven by the controller 131 and the line to be scanned in the display panel 12 driven by the controller 132.

That is, the third embodiment has the following advantages as compared with the second embodiment. Since the controller 131 and the controller 132 are separate circuits, it is likely that, in the second embodiment, the time difference corresponding to one clock may occur between the scan start time of the controller 131 and the scan start time of the controller 132 due to the digital error caused by the two separate circuits. For example, if the scan start time of the controller 131 is delayed by one clock with respect to the scan start time of the controller 132, the state where the line 64 is scanned in the display panel 11 while the line 1 is scanned in the display panel 12 may be generated during the time of one clock cycle. That is, although the one clock cycle is a small time duration, the lines to be scanned in both the display panels may come close to each other during such time duration.

However, in the third embodiment, it is possible to prevent the line to be scanned in the display panel 11 and the line to be scanned in the display panel 12 from coming close to each other. Further, it is possible to eliminate the cause of the image quality degradation.

(Process of Consecutively Writing Luminance Data to Controller)

In the first to third embodiments, it is a main issue how to synchronize the time at which the scan start instruction for the controller 131 is written with the time at which the scan start instruction for the controller 132 is written. After the time at which each scan start instruction for each controller is set, luminance data are consecutively stored in the memory of the controller 131 and the memory of the controller 132. The controllers 131 and 132 automatically continue the scanning operations according to setting information of the scanning direction set in the initial setting, and the like.

Figure 9:
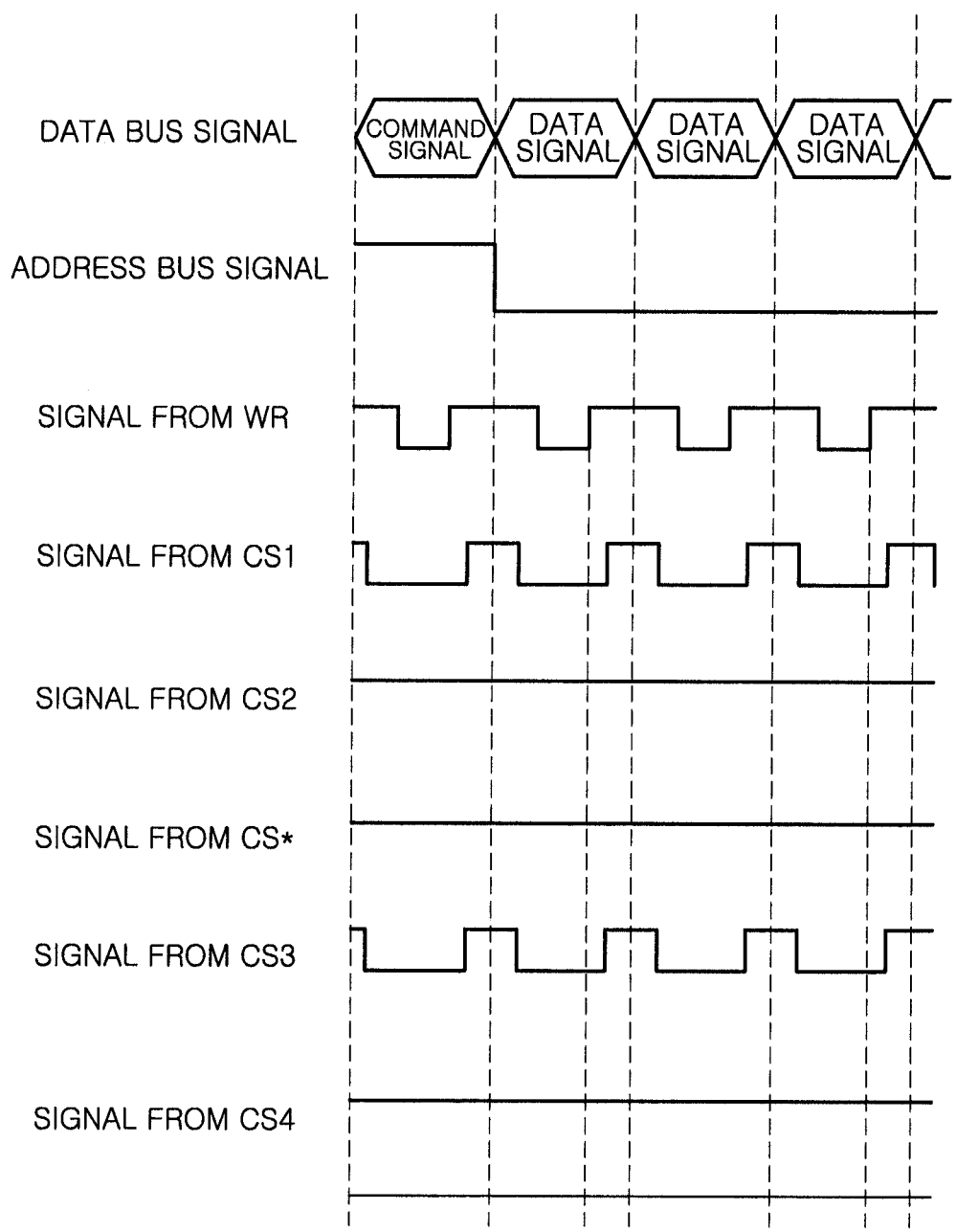
FIG. 9 is a timing diagram illustrating the operation of the display device when luminance data are consecutively written to a controller in accordance with the first and third embodiments.

FIG. 9 is a timing diagram illustrating the operation when luminance data are consecutively written to the controller 131 in accordance with the embodiments. The timing when the luminance data are consecutively written to the controller 132 can be shown in a timing diagram similar to that of FIG. 9, except that the chip select signals are different in content.

The process of consecutively writing the luminance data to the controller 131 in the first and the second embodiment will be briefly described with reference to FIG. 9. The central processing unit 15 generates a data bus signal, an address bus signal, a signal from the write terminal WR, a signal from the chip select terminal CS1, a signal from the chip select terminal CS2, and a signal from the common chip select terminal CS*. Further, the gates 16 and 17 generate a signal from the chip select terminal CS3 and a signal from the chip select terminal CS4, respectively. Although not shown, the signal from the read terminal RD has an H level. The command signal informs the controller 131 that the sequentially continuing data signals are luminance data and instructs that the luminance data are sequentially stored in the memory while sequentially changing the address of the memory of the controller 131.

(Modification of Embodiments)

Although the bus width of the data bus is set to 16 bits in the aforementioned embodiments, the bus width of the data bus may be generally set to F bits. Here, F is an arbitrary positive integer.

Although it has been described in the aforementioned embodiments that the display panel has 256×64 dots, the display panel may generally have J×K dots. Here, J and K are arbitrary positive integers, and includes J=K. More preferably, each of J and K is a number represented by positive powers of two in terms of simplification of the signal processing. In this case, K number of lines from line 1 to line K is formed in the display panel.

In the configuration as described above, the number of luminance control lines is J, and the number of AD terminals AD of the controller is J. The number of on/off control lines is K, and the number of line select terminals SL of the controller is K.

Although it has been described that the number of display panels connected to each other is two and the number of controllers included in the driving circuit is two, the number of display panels may be L and the number of controllers included in the driving circuit may be L in general. Here, L is an arbitrary positive integer. In a case where the number of controllers is L, the operation of the two controllers, described in the timing diagrams shown in FIGS. 5, 6 and 8, may be realized in the two controllers driving two neighboring display panels. If such operation of the two controllers is realized with respect to all of the neighboring display panels, high image quality can be obtained over the entire display area formed by the L number of display panels.

When the number of display panels connected to each other is L in the second embodiment, L number of gates are used rather than the two gates shown in FIG. 2, and the central processing unit is provided with L number of chip select terminals and a common chip select terminal. Each of chip select signals from the L chip select terminals of the central processing unit is inputted to one input terminal of each of the L gates. A common chip select signal from the common chip select terminal of the central processing unit is inputted to the other input terminal of each of the L gates. The chip select terminals of the L controllers are connected to output terminals of the L gates, respectively.

When the number of display panels connected to each other is L in the third embodiment, the central processing unit is provided with L number of chip select terminals. In addition, chip select terminals of the L controllers may be connected to the L chip select terminals, respectively. Alternatively, L number of gates may be used, and the central processing unit may be provided with L chip select terminals and a common chip select terminal as in the first embodiment. In this case, the output signal from the common chip select terminal may have an H level so that only the signals from the L chip select terminals are effective.

Although it has been described in the first to third embodiments that the two display panels have the same scanning direction from the upper side to the lower side in the paper, they may have the same scanning direction from the lower side to the upper side in the paper. Generally, in a case where two or more display panels are provided, the display panels may have the same scanning direction from the upper side to the lower side in the paper or from the lower side to the upper side in the paper if the scanning directions of all the display panels are the same.

Although it has been described in the aforementioned embodiments that the central control unit for controlling the controllers is configured to include the central processing unit, the central control unit may be configured in hardware by using a logic circuit, a memory, a counter, and the like.

Further, when the equidirectional scanning is applied to the display panels, the central control unit may allow each display panel not to emit light during a time corresponding to the scanning of one line after the last one line is scanned in the corresponding display panel. For example, in a case where the number of lines is 64, a line 65 which does not actually exist is virtually scanned, so that it is possible to avoid scanning a line 1 and the line 64 of neighboring display panels simultaneously. Here, the virtual scanning means that the line 1 is scanned after the lapse of time corresponding to the scanning of the line 65 which does not actually exist. The number of virtually scanned lines may be at least one. For example, if the number of virtually scanned lines is two, the display panel does not emit light during a time corresponding to the scanning of the two lines. This example will also have the same effect as described above.

It has been described in the first to third embodiments that an OLED (Organic Light-Emitting Diode), LCD (Liquid Crystal Display), VFD (Vacuum Fluorescent Display) or FED (Field Emission Display) is used as the display panel. The remarkable effect of the embodiments is obtained particularly in the OLED, which has been described in the first to third embodiments. However, the present invention is not limited thereto, various display panels can be used to obtain the same effect.

While the invention has been shown and described with respect to the embodiments, it will be understood by those skilled in the art that various changes and modification may be made without departing from the scope of the invention as defined in the following claims.

What is claimed is:

1. A display device, comprising:
   L number of display panels, wherein L is a positive integer greater than 1;
   L number of gate circuits,
   a driving circuit having L number of controllers for driving the respective display panels, wherein the controllers have a same configuration; and
   a central control unit configured to control the driving circuit, wherein the controllers are configured to be synchronized with one another based on a clock signal from the central control unit, and each of the controllers is configured to start an operation of sequentially selecting K number of lines one at a time, each line being arranged in a row in a corresponding display panel, and allowing the selected line to emit light based on a command signal, which has a scan start instruction, supplied from the central control unit, wherein K is a positive integer greater than 1, wherein a direction for sequentially selecting the lines is identical in all the display panels, and wherein the central control unit is further configured to:

sequentially output L number of chip select signals, wherein each of the chip select signals is used to designate one of the controllers and is supplied to a corresponding controller via one of the gate circuits, whereby initial settings of the controllers are executed in sequence;

simultaneously output the command signal having the scan start instruction to all of the controllers; and output a common chip select signal simultaneously to all of the controllers via the gate circuits, to designate all of the controllers after the initial settings of all of the controllers are completed, so that scan starts in all of the display panels simultaneously.

2. The display device of claim 1, wherein the lines have serial line numbers, and the central control unit controls the controllers to allow the lines having a same line number to simultaneously emit light.

3. The display device of claim 1, wherein the lines have serial line numbers, and the central control unit controls the controllers connected to the display panels adjacent to each other to allow the lines having different line numbers to simultaneously emit light.

4. The display device of claim 1, wherein each of the display panel is an organic light emitting diode.

5. The display device of claim 1, wherein L, which is the number of the display panels and the number of the controllers, is two.

6. The display device of claim 1,
wherein each of the gate circuits receives a chip select signal for the corresponding controller and the common chip select signal, and one having an active level among the chip select signal for the corresponding controller and the common chip select signal is supplied to the corresponding controller.

7. The display device of claim 1, wherein each of the controllers is configured to:

drive luminance control lines and on/off control lines connected to one of the display panels, the luminance control lines controlling luminances of dots of said one of the display panels, and the on/off control lines controlling on/off of dots of said one of the display panels;

receive, when designated by the central control unit, the command signal having the scan start instruction which is carried on a data bus connecting the central control unit and the corresponding controller;

allow the selected line to emit the light by driving an on/off control line connected to the selected line.

8. The display device of claim 2, wherein, after the last one line is scanned in each of the display panels, the central control unit is configured to allow the corresponding display panel not to emit light at least during a time period required in scanning of one line.

9. A driving circuit of a display device, for driving L number of display panels under the control of a central control unit, wherein L is a positive integer greater than 1, the driving circuit comprising:

L number of gate circuits,

L number of controllers for driving the respective display panels, wherein the controllers have a same configuration, wherein the controllers are configured to be synchronized with one another based on a clock signal from the central control unit, and each of the controllers is configured to start an operation of sequentially selecting K number of lines one at a time, each line being arranged in a row in a corresponding display panel, and allowing the selected line to emit light based on a command signal, which has a scan start instruction, supplied from the central control unit, wherein K is a positive integer greater than 1, wherein a direction for sequentially selecting the lines is identical in all the display panels, and wherein the central control unit is further configured to:

sequentially output L number of chip select signals, wherein each of the chip select signals is used to designate one of the controllers and is supplied to a corresponding controller via one of the gate circuits, whereby initial settings of the controllers are executed in sequence;

simultaneously output the command signal having the scan start instruction to all of the controllers; and output a common chip select signal simultaneously to all of the controllers via the gate circuits, to designate all of the controllers after the initial settings of all of the controllers are completed, so that scan starts in all of the display panels simultaneously.

10. The driving circuit of claim 9, wherein each of the controllers is configured to:

drive luminance control lines and on/off control lines connected to one of the display panels, the luminance control lines controlling luminances of dots of said one of the display panels, and the on/off control lines controlling on/off of dots of said one of the display panels;

receive, when designated by the central control unit, the command signal having the scan start instruction which is carried on a data bus connecting the central control unit and the corresponding controller;

allow the selected line to emit the light by driving an on/off control line connected to the selected line.

11. A driving method of a display device including L number of display panels, a driving circuit having L number of controllers and L number of gate circuits for driving the respective display panels, and a central control unit for controlling the driving circuit, wherein the controllers have a same configuration and L is a positive integer greater than 1, wherein the central control unit controls the controllers to be synchronized with one another based on a clock signal, outputs a command signal, which has a scan start instruction, to control each of the controllers to start an operation of sequentially selecting K number of lines one at a time, each line being arranged in a row in a corresponding display panel connected thereto, and to allowing the selected line to emit light, wherein K is a positive integer greater than 1, and sets a direction for sequentially selecting the lines to be identical in all the display panels, and wherein the central control unit is further configured to:

sequentially output L number of chip select signals, wherein each of the chip select signals is used to designate one of the controllers and is supplied to a corresponding controller via one of the gate circuits, whereby initial settings of the controllers are executed in sequence;

simultaneously output the command signal having the scan start instruction to all of the controllers; and output a common chip select signal simultaneously to all of the controllers via the gate circuits, to designate all of the controllers after the initial settings of all of the controllers are completed, so that scan starts in all of the display panels simultaneously.

12. The driving method of claim 11, wherein each of the gate circuits receives a chip select signal for the corresponding controller and the common chip select signal, and one having an active level among the chip select signal for the corresponding controller and the common chip select signal is supplied to the corresponding controller.

13. The display method of claim 11, wherein each of the controllers is configured to:

drive luminance control lines and on/off control lines connected to one of the display panels, the luminance control lines controlling luminances of dots of said one of the display panels, and the on/off control lines controlling on/off of dots of said one of the display panels;

receive, when designated by the central control unit, the command signal having the scan start instruction which is carried on a data bus connecting the central control unit and the corresponding controller;

allow the selected line to emit the light by driving an on/off control line connected to the selected line.

* * * * *